Sept. 27, 1938.  A. J. SAARINEN  2,131,236
ROTARY METER
Filed March 9, 1936  7 Sheets-Sheet 1

Fig.1.

WITNESS
H. Woodard

Inventor
ARMAS J. SAARINEN
By
Attorney

Inventor
ARMAS J. SAARINEN

Sept. 27, 1938.  A. J. SAARINEN  2,131,236
ROTARY METER
Filed March 9, 1936  7 Sheets-Sheet 4

Inventor
ARMAS J. SAARINEN

WITNESS.
H. Woodard

By
Attorney

Sept. 27, 1938.　　　A. J. SAARINEN　　　2,131,236
ROTARY METER
Filed March 9, 1936　　　7 Sheets-Sheet 6

WITNESS
H. Woodard

Inventor
ARMAS J. SAARINEN
By
Attorney

Sept. 27, 1938.  A. J. SAARINEN  2,131,236
ROTARY METER
Filed March 9, 1936  7 Sheets-Sheet 7

Inventor
ARMAS J. SAARINEN

WITNESS
H. Woodard

Patented Sept. 27, 1938

2,131,236

UNITED STATES PATENT OFFICE 2,131,236

ROTARY METER

Armas J. Saarinen, San Francisco, Calif., assignor to Granberg Meter Corporation, San Francisco, Calif., a corporation of California Application March 9, 1936, Serial No. 67,969

15 Claims. (Cl. 73—253)

The invention relates primarily to meters and more particularly to those used principally for measuring gasoline, fuel oils and the like.

One object of the invention is to provide a novel construction in which radial vanes are rotatable in a cylindrical casing and are relatively angled during rotation to admit and discharge the fluid, without the necessity of employing expensive eccentric gears, or using a drum slidably connected with said vanes and occupying a portion of the cylinder, as heretofore proposed.

Another object is to make novel provision whereby a meter constructed in accordance with the invention may be adjusted to increase the maximum angle and decrease the minimum angle (or vice versa) existing between the vanes during operation, to insure accurate agreement between fluid delivered and register reading.

Yet another aim is to provide a comparatively simple and inexpensive, yet a reliable and durable construction.

With the foregoing and minor objects in view, the invention resides in the novel subject matter hereinafter described and claimed, description being accomplished by reference to the accompanying drawings.

The form of construction shown in Figs. 1 to 7 will first be described. In these views, 25 denotes a cylindrical casing having an inlet 26 at one side and an outlet 27 at the other side. While the inlet and outlet are shown opening through the peripheral side wall of the casing 25 in the present disclosure, it is of course possible that one or both of them might open through an end wall of said casing instead. A fixed shaft 28 is disposed within and concentric with the cylindrical casing 25, said shaft being secured by any suitable means 29 to one of the end walls 30 of said casing. The other end wall 31 is provided with an outwardly projecting neck 32 to which a closure plate 33 is suitably secured, providing this end wall of the casing with a cylindrical recess 34 which opens through its inner face. The axis 35 of this cylindrical recess 34 is eccentric to the axis 36 of the shaft 28 in a direction transverse to line 1—1 extending through the inlet 26 and the outlet 27, said direction being indicated by the line 38 in Figs. 3 and 5.

A cylindrical head 39 is disposed within the recess 34, said head being concentric with said recess and closing the open inner side of the latter, the innermost face 40 of said head being flush with the inner face 31' of the end wall 31. This head is fixed during operation of the meter and the face 40 thereof then virtually forms part of the inner face of the end wall 31.

The head 39 is formed with a cylindrical recess 41 which opens through the inner side of said head. The axis 42 of this recess 41 (see Figs. 1, 2, 3 and 5) is slightly eccentric to the axis 35 of the recess 34, but said axis 42 bears a lesser degree of eccentricity to said axis 35, than said axis 35 bears to the shaft axis 36. In a neutral adjustment of the meter, the axis 42 is eccentric to the head axis 35 in the general direction taken by the line 1—1, although this varies with rotative adjustment of the head 39. The relative locations of the axes 35, 36 and 42 is shown diagrammatically in Fig. 5 and in this view, the arrows 43 and 44 denote that the axis 42 may be moved toward the axis 36 (arrow 43) or away from said axis 36 (arrow 44) by rotative adjustment of the head 39. The means for effecting this rotative adjustment will be hereinafter described.

A register-driving disk or member 45 is mounted within and concentric with the recess 41, said disk closing the open side of said recess and having its inner face 46 flush with the inner faces 40 and 31' above described. This disk 45 being mounted concentrically with the recess 41, it follows that the axis of said disk always bears the same relation to the shaft axis 36, that the axis 42 of said recess bears to said shaft axis 36. In the present showing, the disk 45 is provided with a stub-shaft 47 mounted in ball-bearings 48 within the head 39, said stub-shaft being equipped with a spur gear 49 meshing with another spur gear 50 on the driving shaft 51 of the register or counter (not shown). While this shaft 51 is mounted in a combined bearing and stuffing box 52 carried by the cover plate 33 and is therefore relatively stationary, whereas the shaft 47 will be moved a slight distance with respect to said shaft 51 when the head 39 is rotatively adjusted, said movement of said shaft 47 takes place in a direction transverse to a straight line through the axes of these two shafts and the gears 49, 50, and the actual distance between these axes changes only a few thousandths of an inch and does not seriously affect the intermeshing of said gears 49 and 50.

Figure 3:
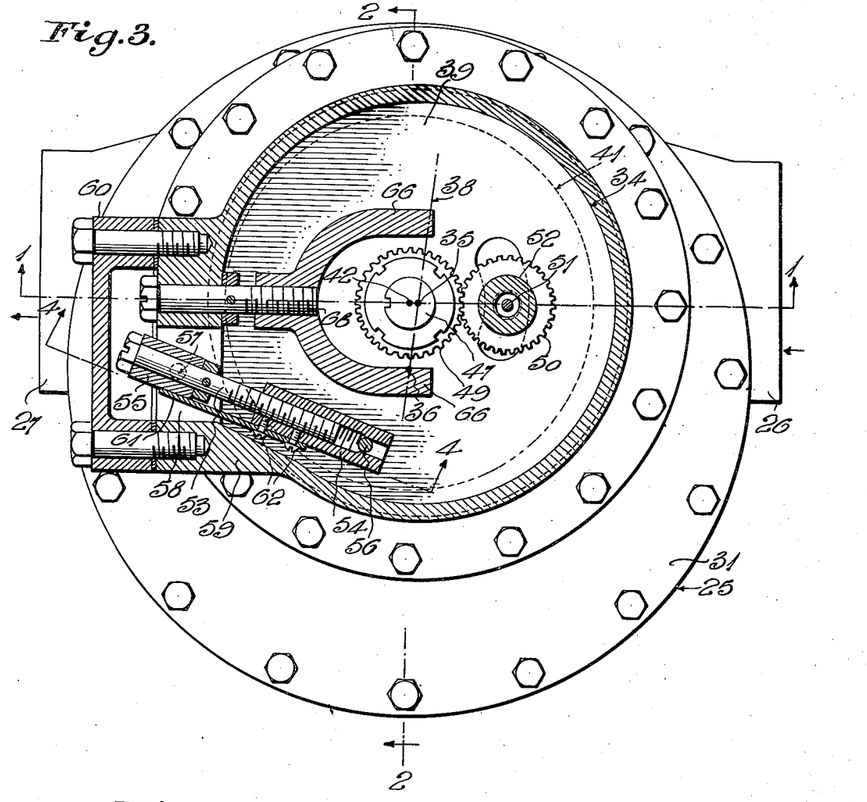
Fig. 3 is a horizontal sectional view on line 3—3 of Fig. 1.
Figure 4:
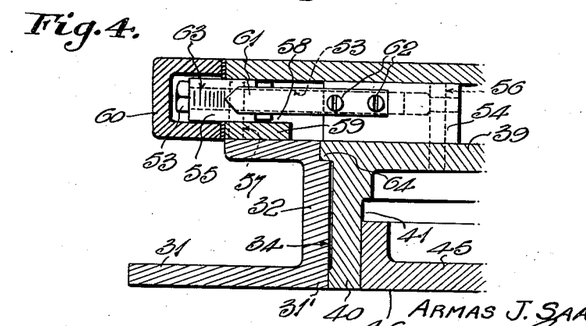
Fig. 4 is a detail vertical section on line 4—4 of Fig. 3.
Figure 5:
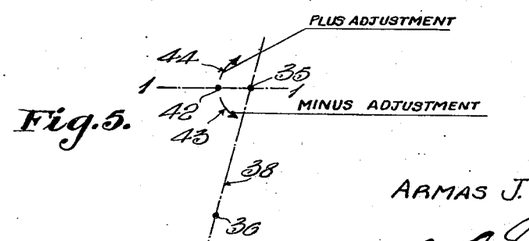
Fig. 5 is a diagram indicating the manner of attaining plus and minus adjustments.

Means for rotatively adjusting the head 39 has been shown as consisting principally of an adjusting screw 53, a sleeve 54 into which one end of said screw is threaded, and a bearing 55 in which the other end of said screw is rotatably mounted (see Figs. 3 and 4). The sleeve 54 is pivoted at 56 to the outer side of the head 39 and the bearing 55 is pivoted at 57 in an opening 58 formed through a boss 59 on the neck 32. The outer end of the opening 58 is normally closed by a removable plate 60 and when this plate is detached, the screw 53 may be readily rotated to rotatively adjust the head 39 in one direction or the other. To indicate the extent of adjustment, an indicating strip 61 is secured by screws or the like 62 to the sleeve 54, and the bearing 55 is provided with indicating lines 63 cooperable with the other end of said strip.

Novel provision is made for locking the head 39 in adjusted position. This head is provided with a peripheral rib 64 lying against a shoulder 65 of the neck 32 to prevent said head from moving inwardly, and a U-shaped wedge 66 is provided to press said head inwardly with such pressure as to tightly hold the rib 64 and shoulder 65 in such frictional engagement as to prevent accidental turning of the head 39. The wedge 66 may lie against the outer face of the head 39 and may coact with inclined or beveled lugs or the like 67 on the inner side of the cover plate 33. An adjusting screw 68 is provided for this wedge, the head of said screw being accessible when the plate 60 above described, is detached. To rotatively adjust the head 39, it is necessary to first operate the screw 68 to release the wedge 66 and to then rotate the screw 53 to effect the desired adjustment. The head is again locked in adjusted position by again tightening the screw 68 to force the wedge 66 to operative position.

Radial vanes 69 are mounted on the shaft 28 for pivotal and rotary movements, said vanes contacting with the peripheral wall of the casing 25, with the inner faces of both end walls of said casing, (including face 40) and with the inner face of the register-driving disk 45. This disk is operatively connected with the vanes 69 by swingable links 70 equal in number to said vanes, said links being pivoted at one end to the disk 45 as shown at 71 and being pivoted at their other ends to the vanes 69 respectively, as illustrated at 72. The pivots 71 are uniformly spaced from the axis 42 about which the disk 45 rotates and they are uniformly spaced in degrees from each other. These pivots 71 travel upon a circular path 73 (Fig. 6) concentric with the axis 42, whereas the pivots 72 travel upon a circular path 74 concentric with the shaft axis 36, and it thus follows that during rotation of the vanes and the disk 45, said vanes are relatively angled so that the spaces between them receive fluid from the inlet 26 and discharge it through the outlet 27 in measured quantities. Rotative adjustment of the head 39, by varying the eccentricity of the disk axis 42 with respect to the shaft axis 36, so varies the relative positions of the circular pivot paths 73 and 74, as to increase the maximum angle existing between the vanes 69 and decrease the minimum angle existing between said vanes (or vice versa) during operation of the meter. It will thus be seen that by rotatively adjusting the head 39, the meter may be adjusted to obtain accurate agreement between fluid output and register reading.

Figures 6, 7:
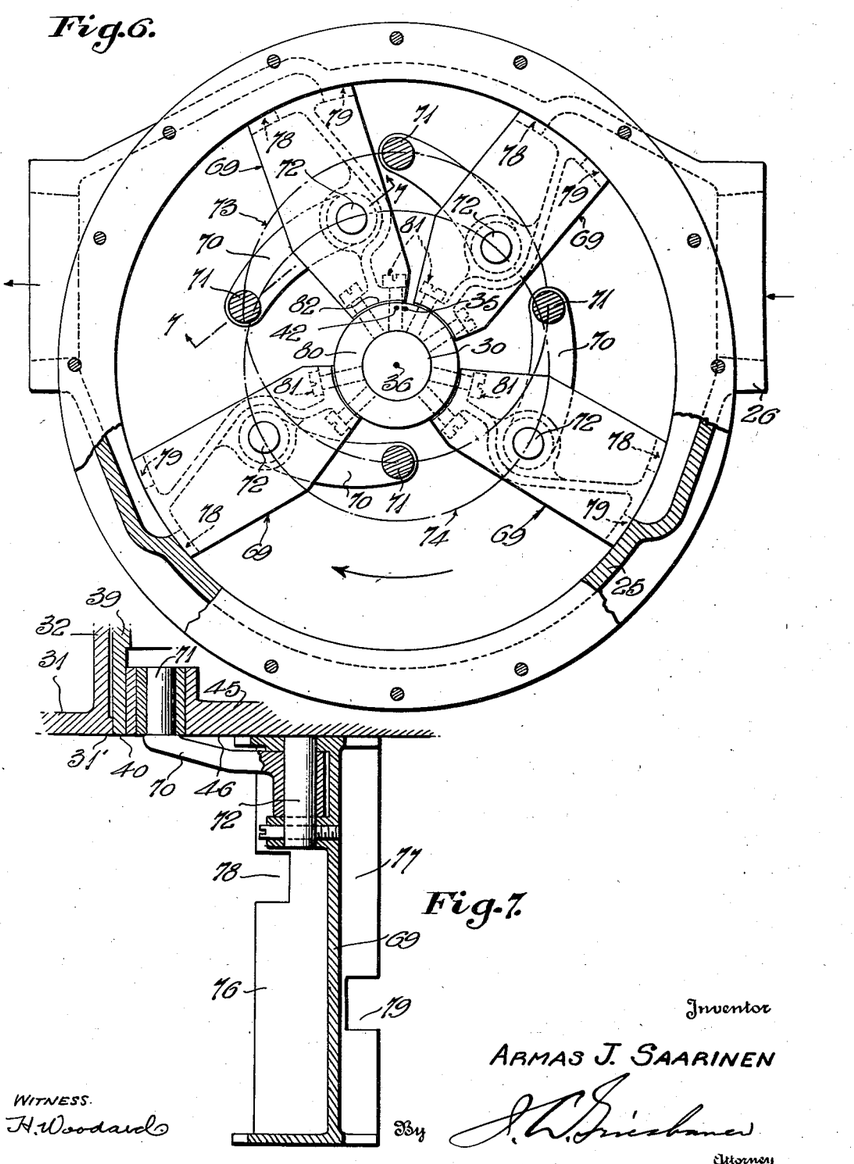
Fig. 6 is a horizontal sectional view on line 6—6 of Fig. 1.
Fig. 7 is a detail vertical section on line 7—7 of Fig. 6.

To guard against fluid leakage past the edges of the vanes 69, these vanes are suitably flanged to increase their effective widths as shown at 76 and 77, but such width is prevented from interfering with closing the measuring chambers to inlet and opening them to outlet, by providing the outer end flanges of the vanes with notches 78 and 79 (Figs. 6 and 7). If these notches were directly opposite each other, the fluid would only have a very short distance in which it might leak from one notch to the other. I, therefore, offset the notches to quite an extent from each other, as shown.

It will be observed that the links 70 do not materially obstruct the segmental spaces existing between the vanes 69, which is not true of certain prior structures in which vanes corresponding to the vanes 69 have been connected with a register-driving disk corresponding to the disk 45, by means of a cylindrical drum connected to said disk and having slots through which the vanes pass slidably. It is, therefore, obvious that I increase the capacity of such a meter without increasing its size. It will also be observed that I attain the necessary relative angling of the vanes 69 during rotation of the meter, without the necessity of mounting said vanes upon separate shafts and providing expensive eccentric gearing for relatively turning said shafts and swinging the vanes relatively, during meter operation. All of the vanes 69 are mounted on the single shaft 28 and I prefer to accomplish this by means of collars 80 contacting with each other and rotatably surrounding said shaft. There is a pair of these collars for each vane 69 and each vane is secured to its respective collars by screws or the like 81. To prevent any vane, however, from dragging upon the collars of other vanes, thin shims 82 (Figs. 2 and 6) are interposed between the inner end of each vane and the collars 80 to which it is secured.

Figures 8, 9, 10:
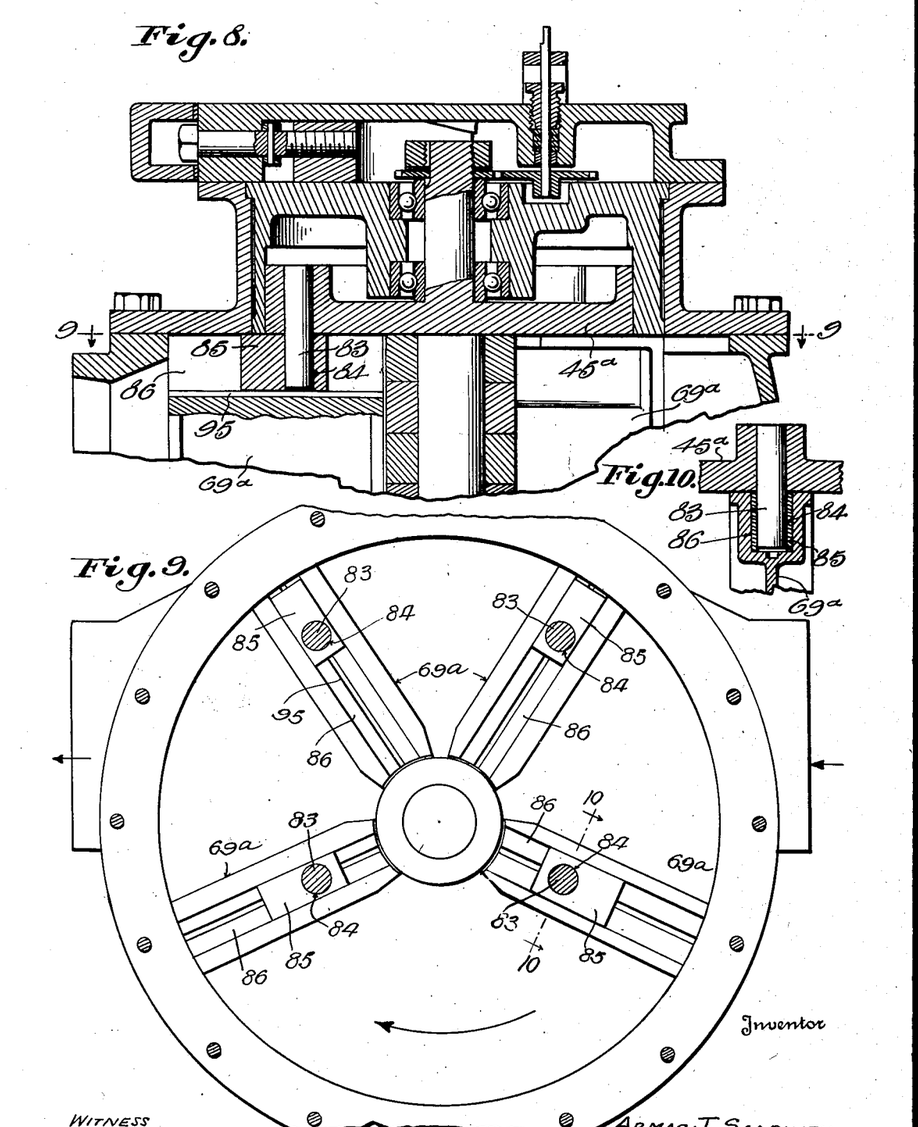
Fig. 8 is a sectional view similar to the upper portion of Fig. 1 but showing a second form of construction.
Fig. 9 is a horizontal sectional view on line 9—9 of Fig. 8.
Fig. 10 is a detail vertical section on line 10—10 of Fig. 9.

In Figs. 8 to 10, the construction is the same as that above described with the exception of the connecting means between the vanes 69ª and the register-driving disk 45ª. In these views, pivot pins 83 are fixedly carried by the disk 45ª, said pins projecting inwardly from said disk and being pivotally received in openings 84 in slide blocks 85, said slide blocks being slidably received in longitudinal grooves 86 formed in the edges of the vanes 69.

Figure 13:
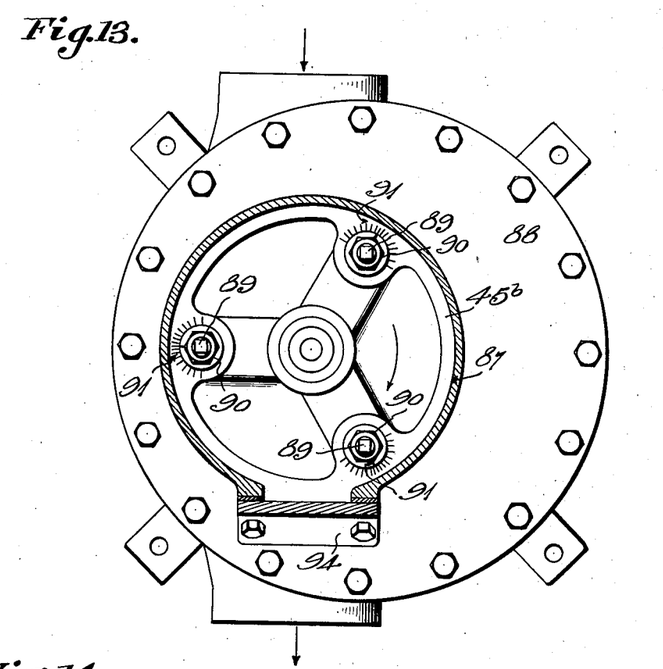
Figures 14, 15:
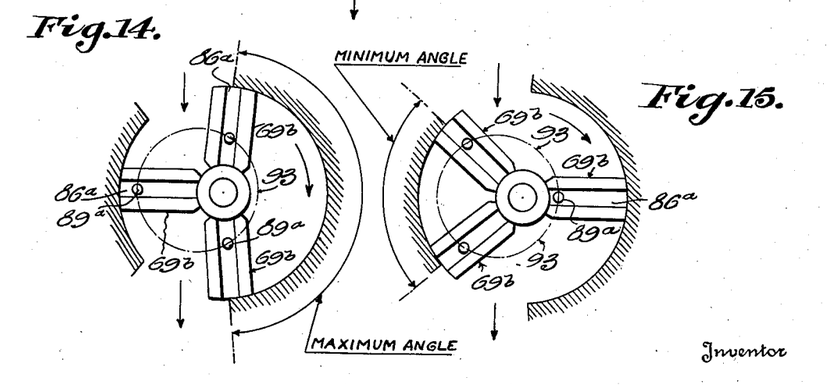
Figs. 14 and 15 are diagrams showing the minimum and maximum angles existing between the vanes in one adjustment of the meter of Fig. 11.

In Figs. 11 to 15, the register-driving disk 45ᵇ is not rotatably mounted within a rotatably adjustable head such as 39, but is merely rotatable within a cylindrical recess 87 which opens through the inner face of the casing end wall 88, said disk 45ᵇ having its inner face flush with said inner face of said end wall 88 so that the two jointly contact with the adjacent edges of the vanes 69b. These vanes are identical with the vanes 69a and their grooves 86a receive slide blocks 85a. Pins 89 pass rotatably through the disk 45b and are provided with eccentric end portions or pivots 89a engaged with the slide blocks 85a, said pins being normally locked against rotation by nuts 90. By loosening these nuts and turning the pins 89, I may vary the maximum and minimum angles existing between the vanes, due to the eccentricity of the pin ends 89a. Suitable indicating means 91 may be employed to assist in making the necessary adjustments, and these adjustments will obtain the same result as that obtained by rotatively adjusting the head 39, that is, insuring agreement between fluid output and register reading. Figs. 14 and 15 diagrammatically show the circular path 93 upon which the eccentric pins 89a travel, and also diagrammatically illustrate the maximum and minimum angles existing between the blades when said pins are adjusted to one of the many positions at which they may be set. To gain access to the nuts 90 and the pins for making adjustments, the casing may be provided with a suitable removable plate 94 (Fig. 13).

Figure 1:
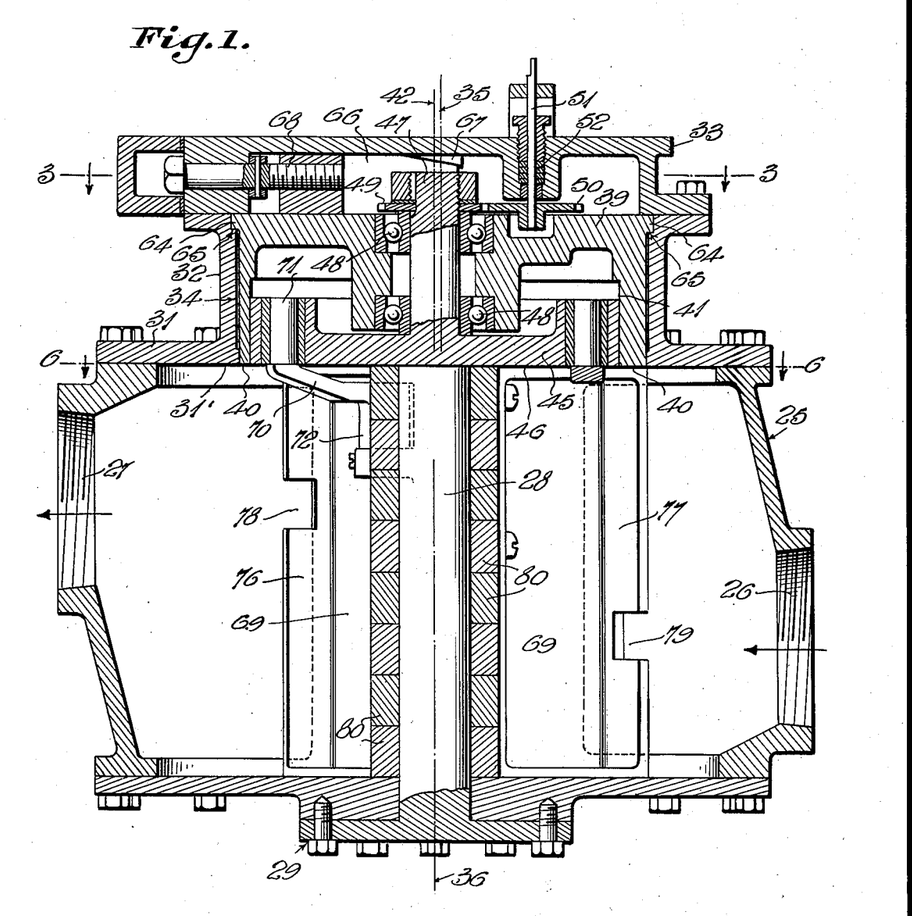
Figs. 1 and 2 are vertical sectional views through one form of the meter, as indicated by lines 1—1 and 2—2 of Fig. 3.
Figure 2:
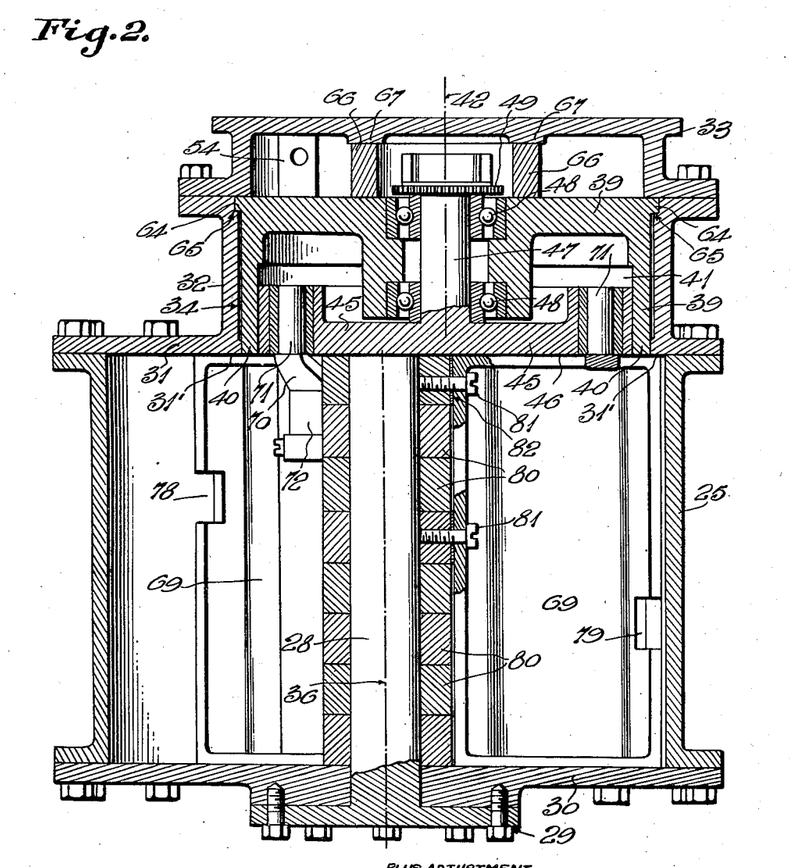
Figure 11:
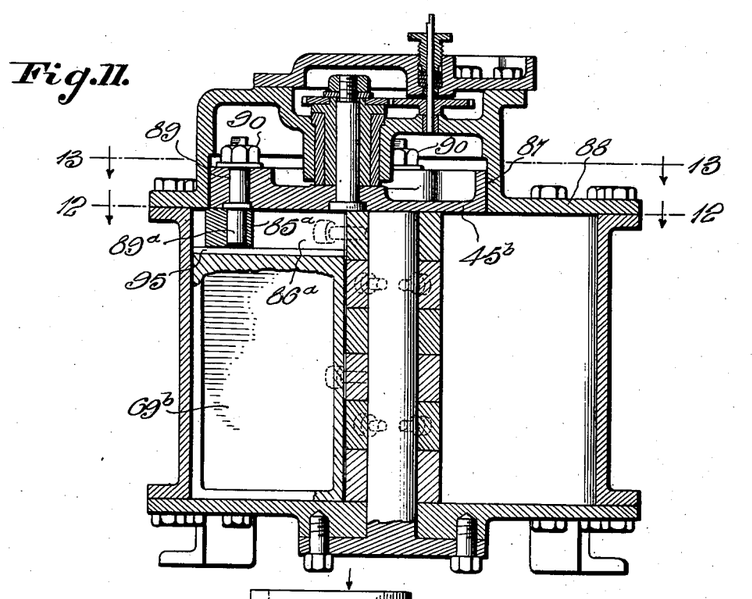
Fig. 11 is a vertical sectional view showing a third form of construction.
Figure 12:
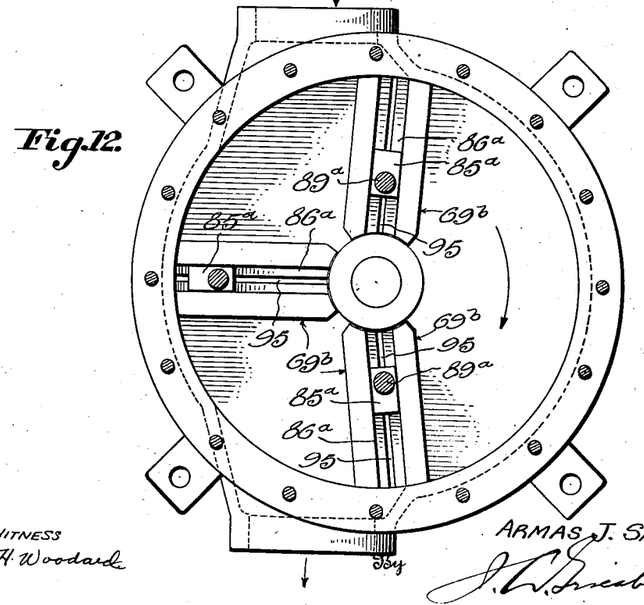
Figs. 12 and 13 are horizontal sectional views on lines 12—12 and 13—13 of Fig. 11.

While I have referred to the rotary member or disk 45 in Fig. 1, 45a in Fig. 8 and 45b in Fig. 11, as a "register-driving" disk because in the embodiments of the invention illustrated in the drawings, it is included in the means for transmitting motion of the vanes to the register-driving shaft, it will be apparent that such disk or member serves the important function of governing or controlling the relative angularity of the vanes of the meter and thereby their displacement.

While I have referred to vanes 69 as contacting with the peripheral wall of casing 25, with the inner faces of both end walls of said casing, and with the inner face of the disk 45, and have referred also to the disk 45b and 88 as contacting with the vanes 69b, slight clearances may be provided instead of actual contact, to insure ease of operation, such clearances, however, being insufficient to permit leakage. Also, it will be understood that the clearance between the inner edge of any vane and the collars 80 of the other vanes, is insufficient to allow leakage. The clearance may, of course, vary with the character of liquid to be handled by the meter.

In both forms of construction embodying the slide blocks (85 or 85a), the receiving grooves (86 or 86a) for said blocks, may be provided with auxiliary grooves 95 to allow fluid displaced from the inner ends of said grooves by the slide blocks, to flow into the outer ends of said grooves and vice versa.

In all forms of construction, the connecting means between the vanes (69, 69a, 69b) and the disk (45, 45a, 45b) includes cylindrical pivots (71, 83, 89a) carried by and spaced apart circumferentially of said disk, and the adjustment to obtain agreement between fluid delivered and register reading is such as to change the distances between the axes of said pivots and the axis 36 of the central shaft 28 about which said vanes rotate. In the form of construction shown in Figs. 1 to 7 and in that disclosed in Figs. 8 to 10, the adjustment is effected by rotatively adjusting the head 39, and in the form shown in Figs. 11 to 15 said adjustment is effected by rotatively adjusting the pins 89. In all cases, the adjustment increases the maximum and decreases the minimum angle between the vanes, or vice versa.

It will be seen from the foregoing that novel and advantageous provision has been made for carrying out the objects of the invention. While preferred features of construction have been shown, variations may be made within the scope of the invention as claimed, and obviously, I am not restricted to size, proportions, number of vanes, etc.

I claim:—

1. A meter comprising a cylindrical casing having an inlet at one side and an outlet at the other side, a stationary shaft within and concentric with said casing, said shaft being carried by one end wall of said casing, the other end wall of said casing being provided with a cylindrical recess opening through the inner face of said other end wall, the axis of said recess being eccentric to the axis of said shaft in a direction transverse to a line through said inlet and outlet, a rotatively adjustable head mounted in said recess coaxially therewith and closing the open side thereof, said head having a cylindrical recess which opens through the inner side of said head and is slightly eccentric to the periphery of said head, the portion of said head between its recess and periphery being provided with an inner face flush with said inner face of said other end wall, a register-driving disk rotatably mounted in the recess of said head and closing the open side of this recess, said disk having an inner face flush with said inner face of said head, vanes mounted on said shaft for pivotal and rotary movement, said vanes contacting with the peripheral wall of the casing, with the inner faces of both end walls of said casing and with said inner faces of said head and disk, means connecting said disk with said vanes, and means for rotatively adjusting said head to vary the distance between the disk axis and the shaft axis and thereby increase the maximum and decrease the minimum angle existing between adjacent vanes, or vice versa.

2. In a meter, a fluid-conducting casing, vanes pivoted upon and rotatable about a common axis within said casing, a register-driving disk eccentric to said axis, means operatively connecting said disk with said vanes, a rotatively adjustable head mounted in the casing and carrying said disk for varying the eccentricity of the disk axis with respect to the vane axis, said casing and head having abutting portions for holding said head against inward movement, a screw-actuated wedge engaging the outer side of said head and a portion of the casing for normally exerting pressure on said head to hold the aforesaid abutting portions of said head and casing in such tight frictional contact as to prevent rotation of said head, and means for rotatively adjusting said head when said wedge is released.

3. In a meter, a fluid-conducting casing, vanes pivoted upon and rotatable about a common axis within said casing, a register-driving disk eccentric to said axis, means operatively connecting said disk with said vanes, a rotatively adjustable head mounted in the casing and carrying said disk for varying the eccentricity of the disk axis with respect to the vane axis, an internally threaded sleeve pivoted to said head, an adjusting screw threaded at one end into said sleeve, a bearing in which the other end of said screw is rotatably and non-slidably mounted, said bearing being pivoted to a part of the casing, and an indicating strip extending longitudinally of said screw and secured at one end to said sleeve, said bearing having indicia cooperable with the other end of said indicating strip when adjusting said screw to rotatively adjust said head.

4. A device of the class described comprising a cylindrical casing having an inlet at one side and an outlet at its other side, a shaft within and concentric with said casing and carried by one end thereof, a disk rotatably mounted in the other end of the casing on an axis which is concentric to the axis of said shaft in a direction transverse to a line through said inlet and outlet, circumferentially spaced pins passing rotatably through said disk and having eccentric end portions projecting therefrom toward said one end of the casing, slide blocks having openings pivotally receiving said eccentric end portions of said pins, vanes having grooves in which said slide blocks are slidably received, said vanes being mounted on said shaft for pivotal and rotary movement, and means for locking said pins normally against rotation with respect to said disk.

5. A meter comprising a cylindrical casing having an inlet at one side and an outlet at the other side, a stationary shaft within and concentric with said casing, said shaft being carried by one end wall of said casing, the other end wall of said casing being provided with a cylindrical recess opening through its inner face, a register-driving disk coaxial with and rotatably mounted in said recess of said other end wall, said disk having an inner face flush with said inner face of said other end wall, the axis of said recess and disk being eccentric to the axis of said shaft in a direction transverse to a line through said inlet and outlet, vanes mounted on said shaft for pivotal and rotary movement, said vanes contacting with the peripheral wall of said casing, with the inner faces of both end walls thereof, and with said inner face of said disk, means connecting said disk with said vanes and leaving the segmental spaces between the vanes substantially unobstructed from the inner to the outer ends of the vanes, a gear casing secured to the end of said cylindrical casing at which said disk is disposed, a central shaft on said disk extending into said gear casing, gearing in said gear casing driven by the last mentioned shaft, and a register-driving shaft driven by said gearing.

6. In a meter, a fluid-conducting casing, vanes pivoted upon and rotatable about a common axis within said casing, a register-driving disk eccentric to said axis, means operatively connecting said disk with said vanes, a rotatively adjustable head mounted in the casing and carrying said disk for varying the eccentricity of the disk axis with respect to the vane axis, said casing and head having abutting portions for holding said head against inward movement, means acting against said head and reacting against a portion of said casing for normally exerting pressure on said head to hold the aforesaid abutting portions in tight frictional contact to prevent rotation of said head, and means for rotatively adjusting said head when said holding means is released.

7. A structure as specified in claim 6; said holding means including a U-shaped pressure member lying against the outer side of said head.

8. A structure as specified in claim 6; said holding means including a rotatable member within a portion of the casing and having an end by means of which it may be rotated, said head-adjusting means also including a rotatable member within a portion of the casing and having an end by means of which it may be rotated; said casing having a removable plate normally preventing access to said ends of said rotatable members but positioned to give such access when removed.

9. A device of the class described comprising a cylindrical casing having an inlet at one side and an outlet at the other side, a stationary shaft within and concentric with said casing, said shaft being carried by one end wall of said casing, the other end wall of said casing being provided with a cylindrical recess opening through the inner face of said other end wall, the axis of said recess being eccentric to the axis of said shaft in a direction transverse to a line through said inlet and outlet, a rotatively adjustable head mounted in said recess coaxially therewith and closing the open side thereof, said head having a recess which opens through the inner side of said head and is slightly eccentric to the periphery of said head, the portion of said head between its recess and periphery being provided with an inner face flush with said inner face of said other end wall, a member rotatably mounted in the recess of said head and closing the open side of this recess, said member having an inner face flush with said inner face of said head, vanes mounted on said shaft for pivotal and rotary movement, said vanes contacting with the peripheral wall of the casing, with the inner faces of both end walls of said casing and with said inner faces of said head and member, means connecting said member with said vanes, and releasable means for normally holding said head against rotation, rotative adjustment of said head serving to vary the distance between the member axis and the shaft axis to thereby increase the maximum and decrease the minimum angle existing between adjacent vanes or vice versa.

10. A device of the class described comprising a fluid-conducting casing, vanes pivoted upon and rotatable about a common axis within said casing, a disk eccentric to said axis, means operatively connecting said disk with said vanes, a rotatively adjustable head mounted in the casing and carrying said disk for varying the eccentricity of the disk axis with respect to the vane axis, said casing and head having abutting portions for holding said head against inward movement, and a screw-actuated wedge engaging the outer side of said head and a portion of the casing for normally exerting pressure on said head to hold the aforesaid abutting portions of said head and casing in such tight frictional contact as to prevent rotation of said head, until said wedge is released.

11. A device of the class described comprising a fluid-conducting casing, vanes pivoted upon and rotatable about a common axis within said casing, a disk eccentric to said axis, means operatively connecting said disk with said vanes, a rotatively adjustable head mounted in the casing and carrying said disk for varying the eccentricity of the disk axis with respect to the vane axis, an internally threaded sleeve pivoted to said head, an adjusting screw threaded at one end into said sleeve, a bearing in which the other end of said screw is rotatably and non-slidably mounted, said bearing being pivoted to a part of the casing, and an indicating strip extending longitudinally of said screw and secured at one end to said sleeve, said bearing having indicia cooperable with the other end of said indicating strip when adjusting said screw to rotatively adjust said head.

12. In a device of the class described, a fluid-conducting casing, vanes pivoted upon and rotatable about a common axis within said casing, a disk eccentric to said axis, means operatively connecting said disk with said vanes, a rotatively adjustable head mounted in the casing and carrying said disk for varying the eccentricity of the disk axis with respect to the vane axis, said casing and head having abutting portions for holding said head against inward movement, and means acting against said head and reacting against a portion of said casing for normally exerting pressure on said head to hold the aforesaid abutting portions in tight frictional contact to prevent rotation of said head until released.

13. A structure as specified in claim 12; said holding means including a U-shaped pressure member lying against the outer side of said head.

14. A meter comprising a cylindrical casing having an inlet at one side and an outlet at the other side, a stationary shaft within and concentric with said casing, said shaft being carried by one end wall of said casing, the other end wall of said casing being provided with a cylindrical recess opening through its inner face, a register-driving disk coaxial with and rotatably mounted in said recess of said other end wall, said disk having an inner face flush with said inner face of said other end wall, the axis of said recess and disk being eccentric to the axle of said shaft in a direction transverse to a line through said inlet and outlet, vanes mounted on said shaft for pivotal and rotary movement, said vanes contacting with the peripheral wall of said casing, with the inner faces of both end walls thereof and with said inner face of said disk, means connecting said disk with said vanes and leaving the segmental spaces between the vanes substantially unobstructed from the inner to the outer ends of the vanes, said connecting means including pivots carried by said disk and spaced apart circumferentially thereof, adjusting means whereby the distances between the axes of said pivots and said shaft may be changed to increase the maximum and decrease the minimum angles between the vanes or vice versa, a gear casing secured to the end of said cylindrical casing at which said disk is disposed, a central shaft on said disk extending into said gear casing, gearing in said gear casing driven by the last mentioned shaft, and a register-driving shaft driven by said gearing.

15. In a meter, the combination of a cylindrical casing having an inlet and an outlet at substantially opposite sides, one end wall of the casing having a recess opening through its inner face, a stationary shaft concentrically mounted in the casing, a vane-controlling member rotatably mounted in said recess and having its inner face flush with the inner face of the casing end wall containing said recess, the axis of said recess and member being eccentric to the axis of said shaft in a direction transverse to a line through said inlet and outlet, vanes mounted on said shaft for pivotal and rotary movement, said vanes contacting with the peripheral wall of said casing, with the inner faces of both end walls thereof and with the inner face of said member, means connecting said member with only the portions of said vanes adjacent said member, leaving the segmental spaces between the vanes substantially unobstructed from the inner to the outer ends of said vanes, said connecting means including cylindrical pivots carried by said member and spaced apart circumferentially thereof, adjusting means whereby the distances between the axes of said pivots and the axis of said shaft may be changed to increase the maximum and decrease the minimum angles between the vanes, or vice versa, a register-driving shaft, and means for imparting the motion of said vanes to said register-driving shaft.

ARMAS J. SAARINEN.